No. 639,077.   Patented Dec. 12, 1899.
H. F. MEISTRELL.
EJECTOR FOR LINOTYPE MACHINES.
(Application filed Feb. 8, 1897. Renewed Aug. 22, 1899.)
(No Model.) 4 Sheets—Sheet 1.
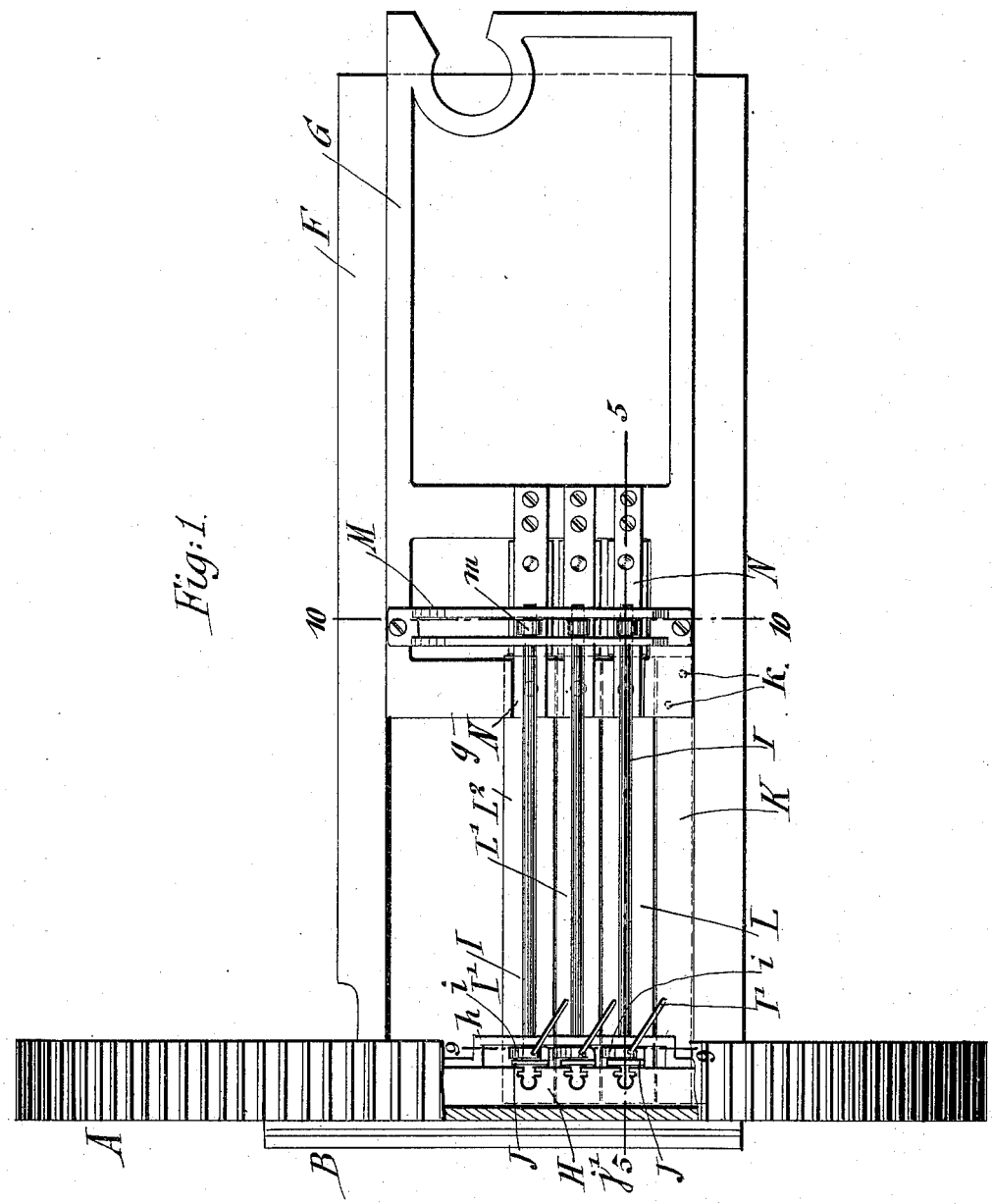
WITNESSES
INVENTOR
Henry F. Meistrell
BY
ATTORNEYS.

No. 639,077. Patented Dec. 12, 1899.
H. F. MEISTRELL.
EJECTOR FOR LINOTYPE MACHINES.
(Application filed Feb. 8, 1897. Renewed Aug. 22, 1899.)
(No Model.) 4 Sheets—Sheet 2.
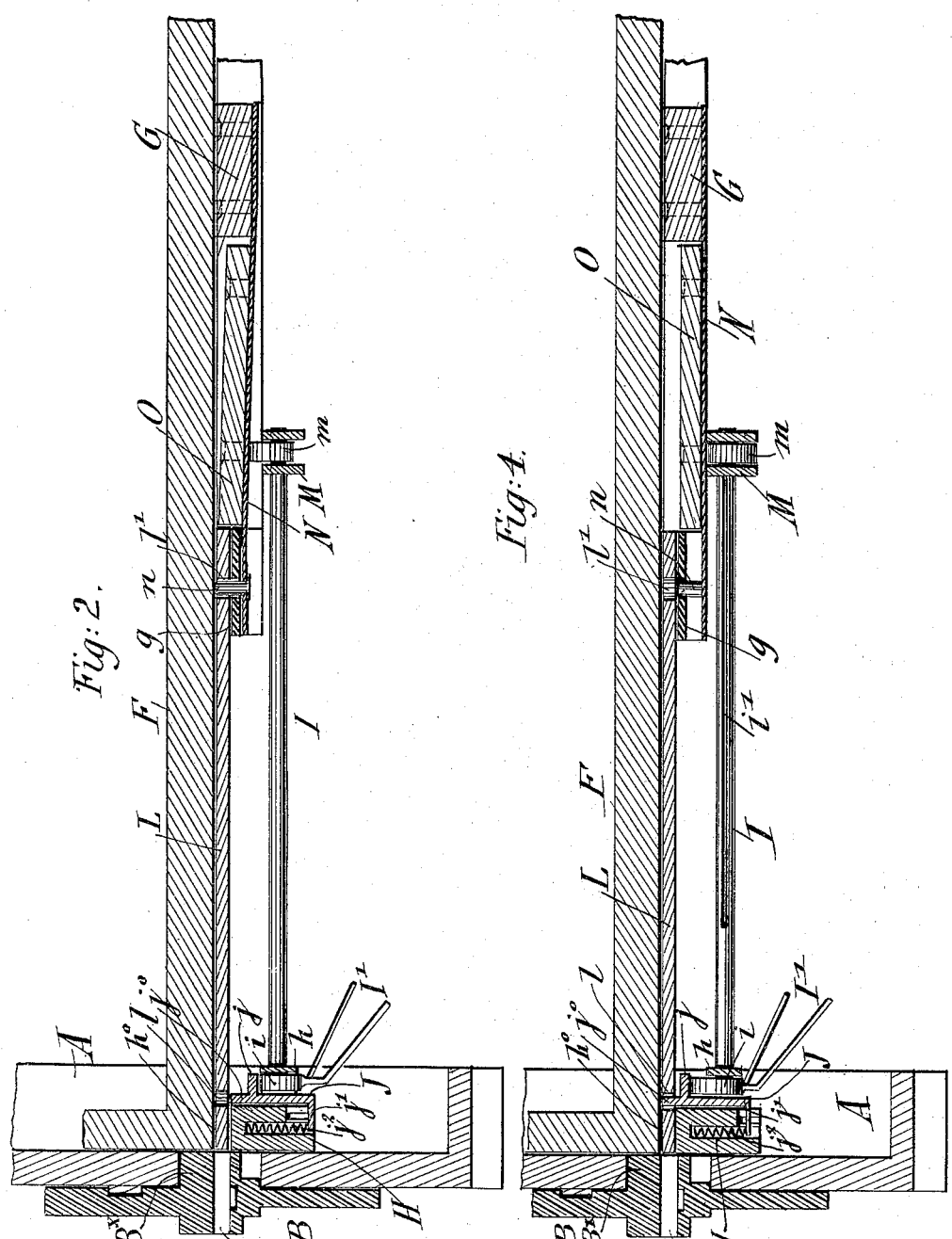
WITNESSES
INVENTOR
BY
ATTORNEYS No. 639,077. Patented Dec. 12, 1899.
H. F. MEISTRELL.
EJECTOR FOR LINOTYPE MACHINES.
(Application filed Feb. 8, 1897. Renewed Aug. 22, 1899.)
(No Model.) 4 Sheets—Sheet 3.
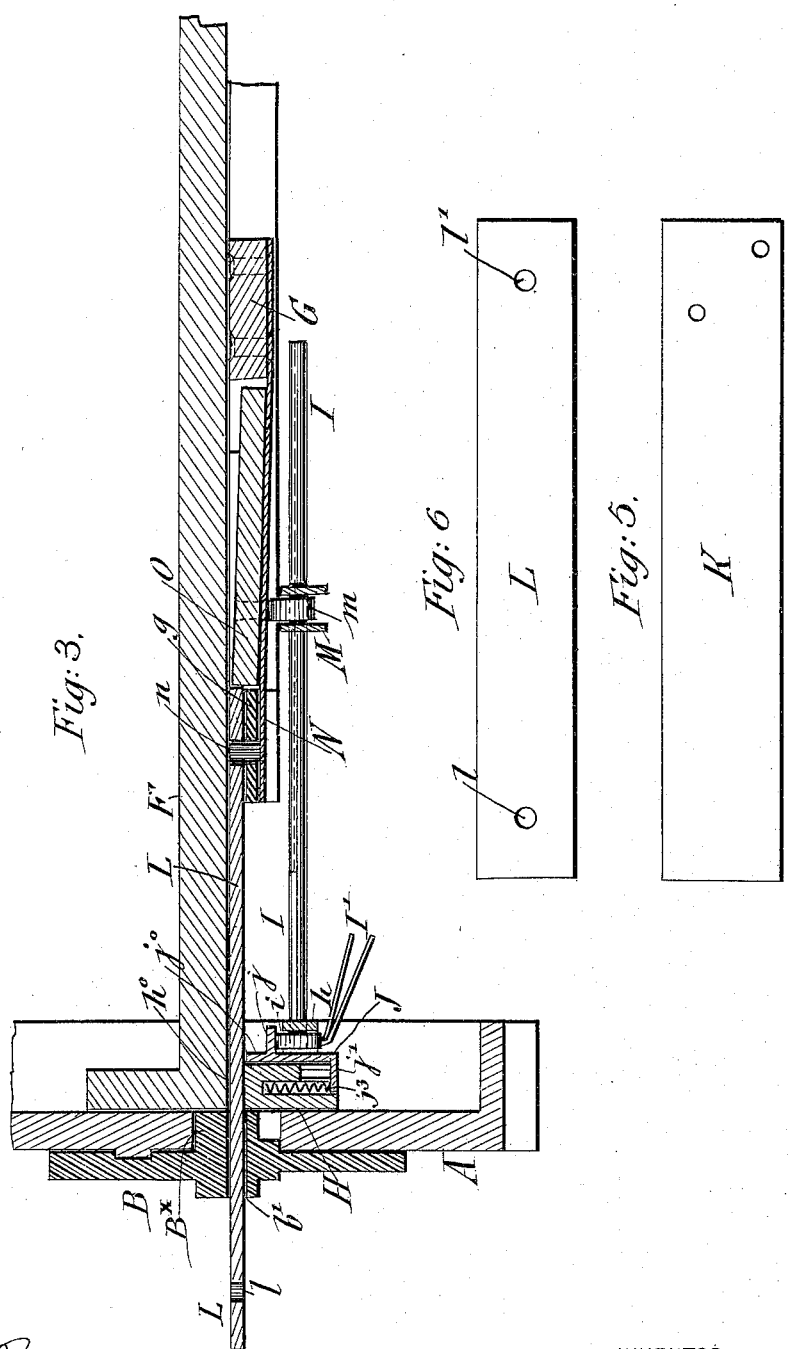

No. 639,077. Patented Dec. 12, 1899.
H. F. MEISTRELL.
EJECTOR FOR LINOTYPE MACHINES.
(Application filed Feb. 8, 1897. Renewed Aug. 22, 1899.)
(No Model.) 4 Sheets—Sheet 4.
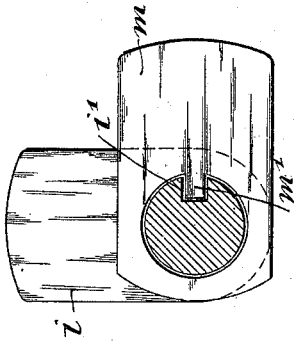
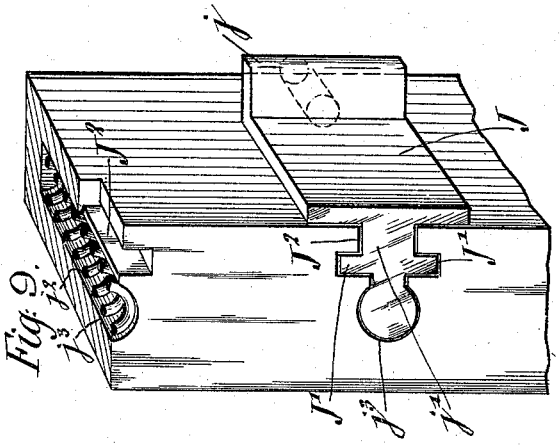
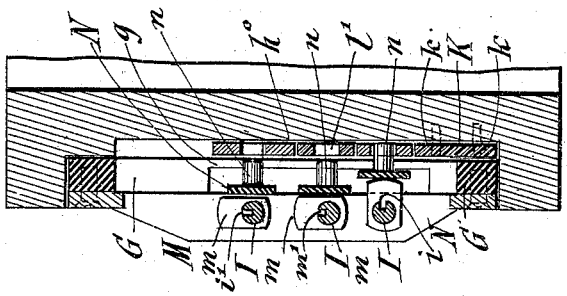
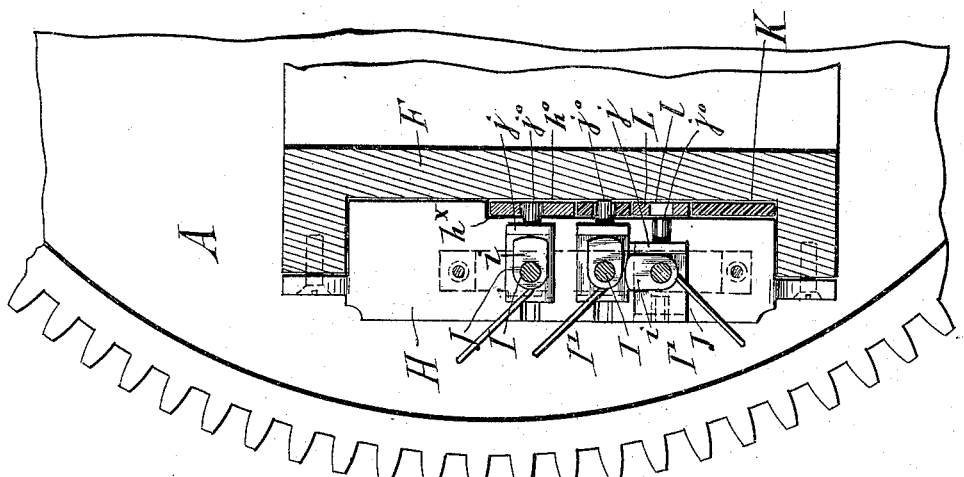
WITNESSES:
INVENTOR
Henry F. Meistrell
BY
ATTORNEYS.

UNITED STATES PATENT OFFICE.

HENRY F. MEISTRELL, OF NEW YORK, N. Y., ASSIGNOR TO THE MERGENTHALER LINOTYPE COMPANY, OF NEW YORK.

EJECTOR FOR LINOTYPE-MACHINES.

SPECIFICATION forming part of Letters Patent No. 639,077, dated December 12, 1899.

Application filed February 8, 1897. Renewed August 22, 1899. Serial No. 728,133. (No model.)

*To all whom it may concern:*

Be it known that I, HENRY F. MEISTRELL, a citizen of the United States, residing in the city, county, and State of New York, have invented certain new and useful Improvements in Ejectors for Linotype-Machines, of which the following is a specification.

My invention consists, broadly, in the combination of an ejector-frame, an ejector-blade variable in width, and means for altering the operative width of the blade without removing the same or any part thereof from the machine; and my invention consists, further, of certain details of construction and combinations of parts described herein and pointed out in the claims.

In the accompanying drawings, Figure 1 is a side elevation showing the ejector mechanism and the mold-carrying wheel. Fig. 2 is an enlarged horizontal section on line 5 5, Fig. 1, showing one of the ejector-blades attached to the ejector-frame for operation. Fig. 3 shows the ejector mechanism in its forward position, having pushed the slug out of the mold. Fig. 4 is a similar view to Fig. 3, but showing the same blade detached and inoperative. Fig. 5 is a side elevation of the fixed ejector-blade. Fig. 6 is a side elevation of one of the detachable or shiftable blade-sections. Fig. 7 is a broken detail view of the mold-carrying wheel, showing in elevation the ejector guide-piece and in section the frame of the machine, the ejector-blades, and the rock-shafts, said section being on line 9 9, Fig. 1. Fig. 8 is a transverse section on line 10 10 of Fig. 1. Fig. 9 is a broken detail perspective view of a portion of the ejector guide-piece, showing one of the cam-operated locking-pieces; and Fig. 10 is an enlarged transverse section of one of the shafts of the ejector mechanism, showing the position of the cams at each end.

Similar letters of reference indicate corresponding parts.

With the exception of the parts hereinafter specifically described the machine may be in all respects of the ordinary construction now in general use.

A represents a vertical mold-carrying wheel provided with one or more slotted molds B, in which the slugs or linotypes are cast, this wheel being rotated intermittingly in the usual manner in order that the molds may be brought alternately to the casting position and to a position opposite the ejector, which serves to expel the slugs or linotypes therefrom.

F indicates a portion of the main frame of the machine, in which there reciprocates horizontally the ejector frame or slide G, carrying the ejector-blade and connected with driving mechanism in the usual manner, so that after each rotation of the mold-carrying wheel the frame will slide forward, and thereby cause the ejector-blade to drive the newly-formed slug or linotype out of the mold, which at this time stands in a vertical position, as usual.

H is the ejector-blade guide, fixed to the main frame, as usual, to keep the front end of the ejector-blade in exact alinement with the mold-slot. This guide, although fixed to the frame in the usual position and in the ordinary manner, is modified in detail, as hereinafter described.

The ejector-blade or ejector proper, instead of being in a single piece or blade, as heretofore, is composed of several longitudinal blades or sections K, L, L', and L², lying one above another, as shown in Figs. 1, 3, 5, 6, 7, and 8, and so arranged that the lower section K may be used alone or in connection with one, two, or more of the other sections, according to the length of the mold in use and the width of the ejector demanded. The lower blade K, which is usually fixed permanently to the carrier-slide G, will serve alone as an ejector for short slugs. As the lengths of the slugs and the mold are increased, one, two, or more of the sectional blades are locked to the slide G and caused to coöperate with the lower blade K, thus increasing the width of the ejector as may be demanded.

The sections or blades required for use are locked for the time being to the slide G, so that the two, three, or more sections constitute, jointly, the ejector, while the sections which are for the time being out of use remain in the machine, being drawn backward and locked in position, so that although they are for the time being inactive they remain in the machine and in position to be called immediately into action.

The blade-sections L L', &c., are each locked to or disengaged from the operating-slide G in the manner following: There is secured to the slide in line with each blade a spring N, extending forward and having a shoulder O to drop behind the blade and also a stud $n$ to engage in a hole in the rear end of the blade, as shown in Fig. 3. When the parts are thus engaged, the advance of the line causes the shoulder O to drive the ejector-blade forward, projecting its forward end through the mold B, and when the slide retreats the stud $n$ will pull the blade backward. The spring N has a constant tendency to spring sidewise away from the blade L, so as to effect a disconnection; but while the blade is required for use the connection is maintained by an eccentric $m$, bearing on the outer face of the spring, as shown in Figs. 3 and 7. This eccentric is sustained and rotated, as shown in Figs. 3, 7, 8, and 10, by a horizontal rock-shaft I, longitudinally grooved, extending loosely through the vertical guide M, fixed on the slide G and embracing the eccentric, so that as the slide moves forward and backward the eccentrics move therewith lengthwise of the rock-shaft without changing their relation to the springs. Each of these rock-shafts is fixed against longitudinal motion, its forward end carrying an eccentric-head $i$, which is seated in a cavity in the fixed guide H and provided with handles I' for the purpose of turning the rock-shaft in order to operate the eccentric $m$, and thus effect the connection or disconnection of the ejector-blade. When the rock-shaft and eccentric are turned to the position shown in the upper part of Fig. 8 and in Fig. 10, the coupling-pin $n$ is withdrawn from the ejector-blade by the spring, and at the same time the shoulder O is withdrawn laterally from behind the blade, thus allowing the spring and shoulder to pass forward as the slide advances without effecting the projection of the blade, or, in other words, the inner end of the blade is permitted to rest idly between the frame F and the shoulder of the spring. This disconnection of the sectional blades must obviously be effected when they are retracted from the mold, and in order to prevent their accidental advancement it is desirable that they shall be locked at rest, so that they may not be accidentally projected, to the injury or obstruction of the other parts. This locking is effected by horizontal slides J, (shown clearly in Figs. 3 and 9,) mounted in the ejector-guide H and acted upon by the above-mentioned cams $i$ on the forward ends of the rock-shafts. These slides are each provided with a stud at the inner end to enter a hole $l$ in the forward end of the blade, and they are pushed constantly backward by spiral springs $j^3$, seated in the guide, as shown. The arrangement is such that when the rock-shaft is turned so that the cam $m$ disconnects the blade-operating devices at the one end the cam $i$ at the same time actuates the slide J to lock the blade at the forward end, and vice versa. Thus it will be seen that each ejector blade or section when locked to the carrying-slide is at the same time released at its forward end and, on the other hand, locked in its backward position whenever it is released from the slide.

When the length of line to be produced in the machine is changed, it is only necessary for the attendant to see that the ejector-slide is retracted and then reach inward and turn one or more of the handles I', according to the width of the ejector required.

I believe myself to be the first to construct an ejector in longitudinal sections adapted to be thrown into and out of action at will without removal from the machine, and this I claim under any form or arrangement the mechanical equivalent of that herein described.

It will be apparent to the skilled mechanic that the essence of the invention lies in the employment of several sections, which may be caused to coöperate at will, or one or more of which may be allowed to remain idle in the machine while others are in action.

It will be manifest to the skilled mechanic that the details of construction may be widely varied, the exact form of the devices for connecting the blades to the carrier and for holding the inactive blades at rest being of minor importance.

While I recommend the use of the guiding-shoulders O on the springs, it is apparent that they are not necessary features, since the coupling-pins $n$, extending, as they do, through a cross-bar $g$ on the slide G, will in themselves be sufficient to effect both the advancement and retraction of the blade.

Having described my invention, what I claim is—

1. In a linotype-machine, the combination with the frame and detachable blades therein of locking devices respectively for locking the ejector-blades to the ejector frame or slide and for locking the blades to the frame of the machine when they are released from the ejector-frame.

2. In a linotype-machine, the combination of an ejector-frame, a plurality of detachable blades arranged edge to edge, and means for connecting the individual blades to or releasing them from the ejector-frame without removing them from the machine, substantially as set forth.

3. In a linotype-machine, the combination of the ejector-frame, or ejector-blade variable in width, and means for altering the width of the blade without removing the same or any part thereof from the machine.

4. In a linotype-machine, the combination of the ejector-frame, its ejector-blade adjustable in width, and means mounted on the machine for adjusting said blade without removing any part thereof from the machine.

5. In a linotype-machine, the combination of an ejector-frame, a plurality of blades connected thereto, and means for releasing one or more of said blades from the ejector-frame at will, substantially as set forth.

6. In a linotype-machine, the combination of the ejector-frame, detachable ejector-blades, rock-shafts provided with cams and devices actuated by the respective cams for locking the ejector-blades alternately to the ejector-frame and to the machine-frame when released from the ejector-frame.

7. In a linotype-machine, a combination of the ejector-frame, detachable blades, ejector-guide, devices for locking the blades to the ejector-frame, devices for locking the blades at rest, and rock-shafts, each having cams arranged to operate two locking devices, whereby each ejector-blade may be locked at rest or locked to the carrying-frame at will.

8. In a linotype-machine in combination, the ejector-frame, detachable ejector-blades provided with openings in both ends, and locking devices arranged to respectively engage the rear openings of the blades for locking the same to the ejector-frame and for engaging the forward openings of the ejector-blades to hold them at rest when released from the ejector-frame.

9. In a linotype-machine, the combination of the ejector-frame provided with a plurality of locking springs and studs, a plurality of coöperative ejector-blade sections adapted to be engaged by the respective studs, and means for operating the studs independently, whereby one or more of the sections may be released independently of the others.

10. In a linotype-machine, the combination of the ejector-frame, flat springs provided with pushing-shoulders and locking-studs, detachable ejector-blades adapted to be engaged by said studs and shoulders, substantially as shown.

11. In a linotype-machine, an ejector frame or slide, a series of detachable ejector-blades, means for detachably connecting said blades to the said frame, and means for locking the ejector-blades to or releasing them from the frame at will.

12. In a linotype-machine, an ejector, consisting of a plurality of longitudinal sections, and means whereby one, two or more of said sections may be operated at will, while the remainder are permitted to remain at rest within the machine.

In testimony that I claim the foregoing as my invention I have signed my name in presence of two subscribing witnesses.

HENRY F. MEISTRELL.

Witnesses:
 GEO. L. WHEELOCK,
 GEO. W. JAEKEL.